United States Patent [19]
Warren, Sr.

[11] Patent Number: 5,463,885
[45] Date of Patent: Nov. 7, 1995

[54] TRAILER WHEEL LOCK

[76] Inventor: Jerry D. Warren, Sr., P.O. Box 22, Franklinton, La. 70438

[21] Appl. No.: 199,849

[22] Filed: Feb. 22, 1994

[51] Int. Cl.$^6$ ............................ E05B 73/00; B60R 25/00
[52] U.S. Cl. .................................. 70/18; 70/226; 70/14; 70/227
[58] Field of Search ................... 40/14, 18, 225–227, 40/233, 237–238, 198–203; 70/14, 18, 226

[56] References Cited

U.S. PATENT DOCUMENTS

| | | | |
|---|---|---|---|
| 1,042,875 | 10/1912 | Bishop | 70/227 |
| 1,443,009 | 1/1923 | Davis | 70/227 |
| 1,467,353 | 9/1923 | Childress | 70/227 |
| 1,488,893 | 4/1924 | Plouffe | 70/226 |
| 3,695,071 | 10/1972 | West | 70/18 |
| 3,713,668 | 1/1973 | Flindt | 70/226 |
| 3,845,643 | 11/1974 | Barrett | 70/226 |
| 4,057,982 | 11/1977 | Drayton | 70/14 |
| 4,380,160 | 4/1983 | Hoffman | 70/14 |
| 4,873,851 | 10/1989 | Arnett | 70/259 |
| 4,875,819 | 10/1989 | Wilkinson | 411/432 |
| 4,880,334 | 11/1989 | Henry | 411/374 |
| 4,884,422 | 12/1989 | Wolter | 70/165 |
| 5,301,527 | 4/1994 | Pollard | 70/226 |
| 5,372,018 | 12/1994 | Smith | 70/18 |

*Primary Examiner*—Peter M. Cuomo
*Assistant Examiner*—Tuyet-Phuong Pham
*Attorney, Agent, or Firm*—H. Dennis Kelly; Timmons & Kelly

[57] ABSTRACT

A cover plate with a center cap is placed over a wheel installed on a truck trailer. A tang on the cover plate, located on the side facing the wheel, passes through a slot in the wheel. The plate is then rotated until the tang touches a wheel spoke, and a projection on the tang extends under the wheel spoke holding the tang to the wheel. A slot on the opposite side of the cover plate overlaps another slot in the wheel. A flange attached to a chain is passed up through the wheel slot and the slot in the cover plate. The chain flange is then secured in place by a padlock attached through an eyehole in the chain flange. An identical installation is made on the tandem wheel using another cover plate and the flange on the other end of the chain.

11 Claims, 4 Drawing Sheets

# TRAILER WHEEL LOCK

BACKGROUND OF THE INVENTION

1. Field of the Invention

This invention relates in general to locks. In particular, the invention relates to locks for installing on trailer wheels, securing them to prevent theft of the trailer and the wheel.

2. Description of the Related Art

Trailers with multiple axles are widely used for hauling cargo. These trailers and their cargo are also a popular target for theft.

People have tried various ways to prevent theft of trailers. One method is to secure the trailer to a stationary object with a chain and lock. Unfortunately, a proper stationary object may not be available, and the chain and lock are exposed and can be cut by bolt cutters or other devices.

Another device for preventing movement of a vehicle is affixed to the outer surface of a wheel, and holds the wheel fixed relative to the axle. This device is relatively expensive, complex and troublesome to install and remove, and is used generally for law enforcement rather than theft prevention. Other common wheel locks are intended simply to prevent theft of the wheel itself rather than the entire vehicle.

SUMMARY OF THE INVENTION

The general object of the invention is to secure the wheels on a trailer so as to prevent theft of the trailer. This object is achieved by a cover plate affixed to the outer surface of the wheel and secured through the wheel to a flange attached to the end of a chain. If the trailer is moved, movement of the wheel and the attached cover plate will cause the chain to go taut, preventing any further wheel rotation and thus any further movement of the trailer.

Another object of the invention is to prevent theft of the trailer wheels. This object is also achieved by the wheel cover plate. When mounted on the wheel, the cover plate prevents access to the lug nuts attaching the wheel to the axle. The cover plate is secured to the wheel to prevent unauthorized removal of the cover plate.

The above, as well as additional objects, features, and advantages of the invention will become apparent in the following detailed description.

DESCRIPTION OF THE PREFERRED EMBODIMENT

Figure 1:
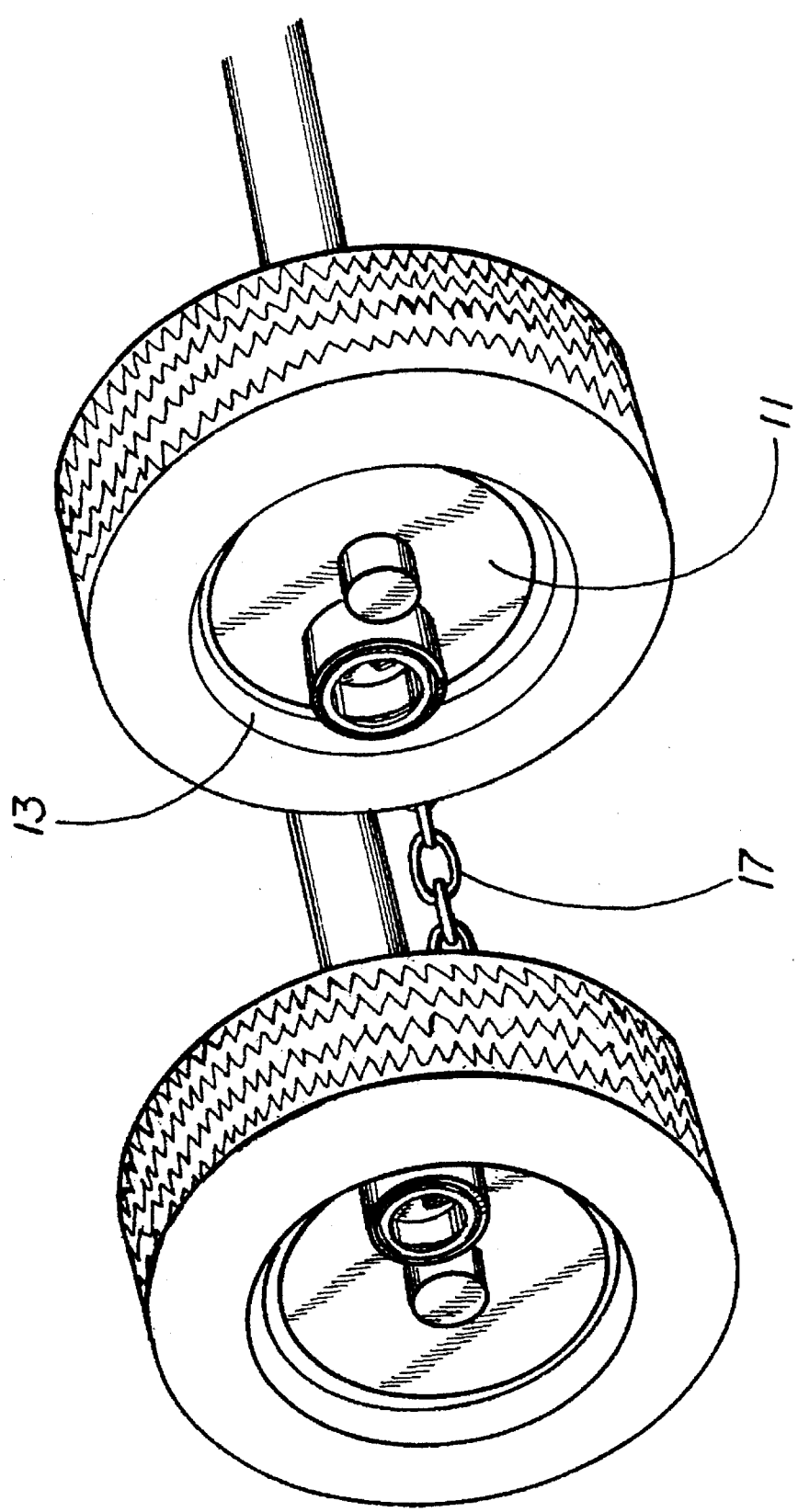
FIG. 1 is a perspective view of a trailer wheel lock according to the invention, as it appears when installed on adjacent trailer wheels.

FIG. 1 shows the preferred embodiment of the trailer wheel lock 11 of the invention as installed on a wheel 13. The trailer wheel lock 11 includes a pair of cover plates 15 and a chain assembly 17.

Figure 2:
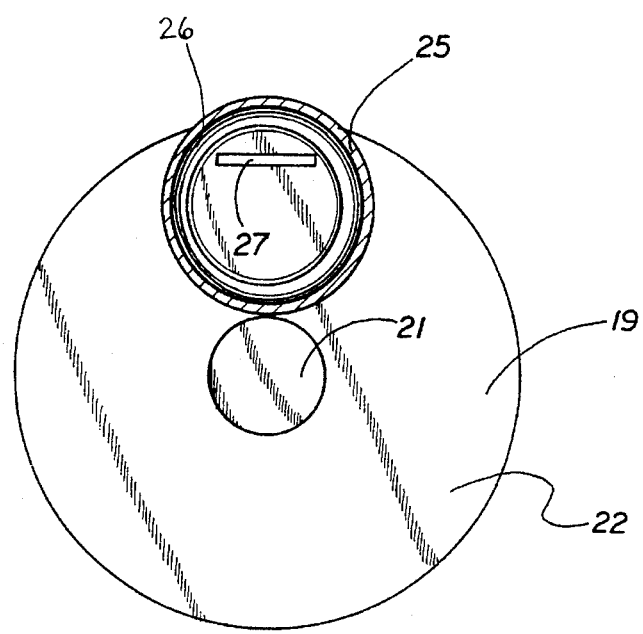
FIG. 2 is a side elevation of the outer surface of the wheel cover plate.
Figure 3:
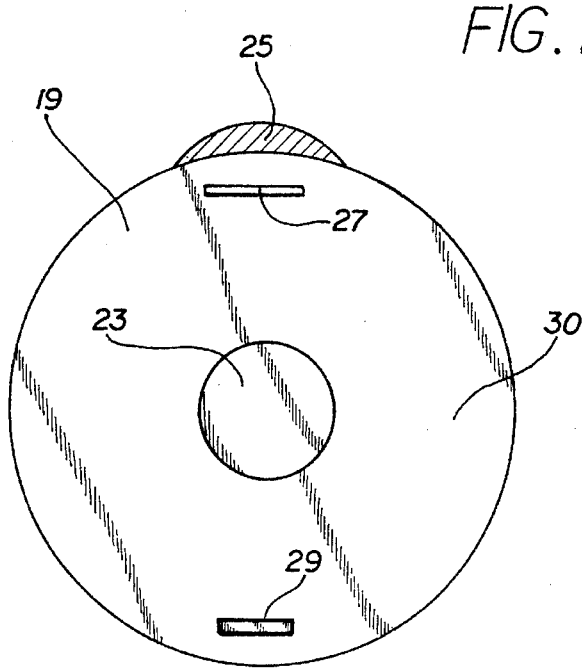
FIG. 3 is a side elevation of the inner surface of the wheel cover plate.
Figure 4:
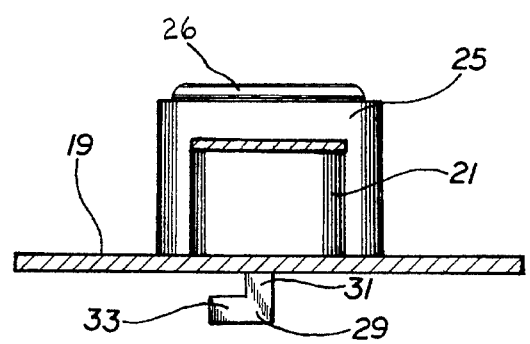
FIG. 4 is a bottom plan view of the wheel cover plate.

As shown in FIGS. 2–4, each cover plate 15 has a main flange 19 constructed from one-quarter inch (6 millimeters) thick sheet metal cut into a disc with a diameter of twelve inches (305 millimeters). The plate 15 may be sized differently to allow installation on wheels of different sizes.

A center cap 21, constructed of a 2 inch (51 millimeters) length of three inch (76 millimeters) nominal size metal pipe, is welded on the outer surface 22 of main flange 19 with the cap 21 concentric with the main flange 19. The top of the cap 21 is made from one-quarter inch (6 millimeters) thick sheet metal cut into a disc the same diameter as the metal pipe and welded onto the top of the pipe. A hole 23 is cut in the main flange 19, concentric with the main flange 19 and the center cap 21 and sized to be flush with the inside edge of the center cap 21.

A protective sleeve 25, constructed of a 3 inch (76 millimeters) length of four inch (102 millimeters) nominal size pipe, is welded on the outer surface 22 of the main flange 19 abutting the center cap 21. A protector ring 26 is welded to the inside of the outer end of protective sleeve 25. The protector ring 26 is constructed from steel pipe or tubing with one-half inch (12 millimeters) outside diameter, bent into a ring with its outside diameter equal to the inside diameter of protective sleeve 25. A cover plate slot 27 is cut into the main flange 19 within the area circumscribed by the protective sleeve 25, about one and seven-eighths inches (48 millimeters) from the outer edge of the main flange 19, perpendicular to and bisected by the radius of the main flange 19 passing through the center of the protective sleeve 25.

A tang 29, constructed of one-quarter inch (6 millimeters) thick sheet metal, is welded on the inner surface 30 of the main flange 19 on the opposite face from the center cap 21 and protective sleeve 25, about one and seven-eighths inches (48 millimeters) from the outer edge of the main flange 19 across the main flange 19 from the cover plate slot 27. The tang 29 has a shank 31 that is one and a half inches high by one inch wide (38 millimeters by 25 millimeters).

A projection 33 one inch (25 millimeters) wide extends out from the tang shank 31 for about one and a quarter inches (32 millimeters), running parallel to the main flange 19 with a half inch (12 millimeter) gap between the projection 33 and the inner surface 30 of the main flange 19. The dimensions of projection 33 and cover plate slot 27 may be varied to allow the cover plate to be installed on wheels with different slot sizes and patterns.

Figure 5:
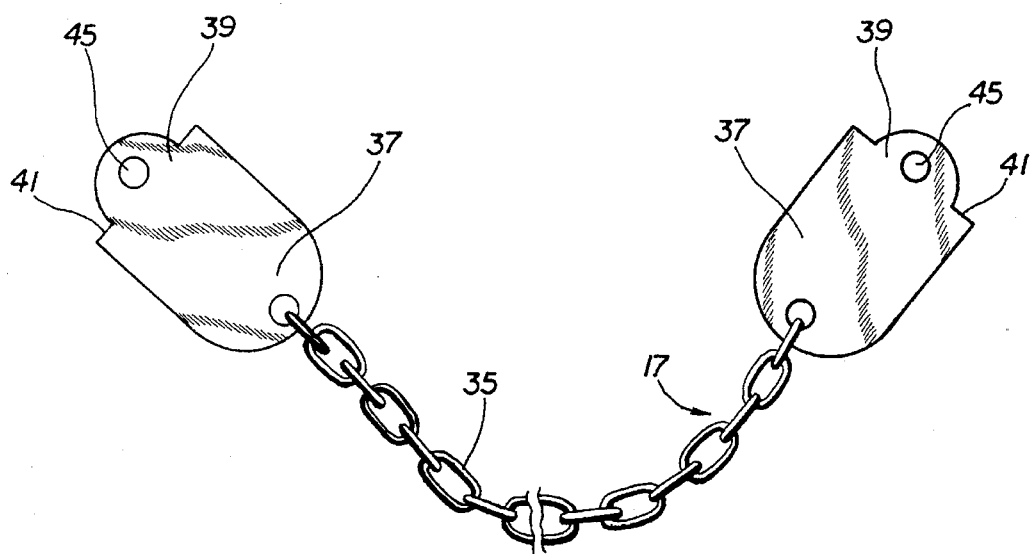
FIG. 5 is a top plan view of the chain assembly.

The chain assembly 17 is shown in detail in FIG. 5. A span of case hardened metal chain 35, about thirty inches (762 millimeters) long, terminates at each end in a flange 37, constructed of one-quarter inch (6 millimeters) thick sheet metal about three inches wide by four and a half inches long (76 by 114 millimeters). At the distal end of the flange 37 is a tongue 39 about two and a half inches wide and one and a half inches long (64 millimeters by 38 millimeters). The junction of the flange 37 and the tongue 39 forms a pair of shoulders 41. An eyehole 45 about three-eighths inches (10 millimeters) in diameter is drilled about one half inch (12 millimeters) from the distal end of the tongue 39.

Figure 6:
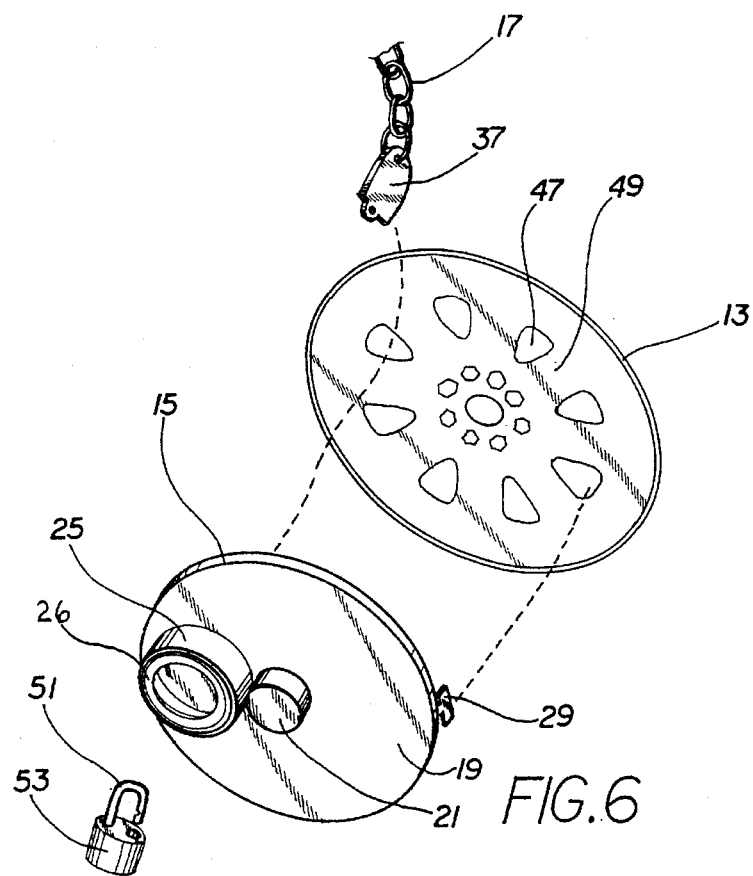
FIG. 6 is an exploded perspective view of the wheel cover plate, chain assembly and the wheel as they are oriented with respect to each other when installed on a tandem set of trailer wheels.

Installation is depicted in FIG. 6. The cover plate 15 is placed over the wheel 13 so that tang 29 projects through one of the wheel slots 47. The cover plate is then rotated clockwise until the tang 29 touches the wheel spoke 49, with projection 33 under the wheel spoke. The cover plate slot 27 should then be aligned with the opposing wheel slot 47. One of the flanges 37 on chain assembly 17 is then passed through the wheel slot 47 and the aligned cover plate slot 27 until shoulder 41 touches the wheel spoke 49. The shackle 51 of a padlock 53 is then passed through the eyehole 45 on the flange 37, and the padlock 53 is latched, securing the cover plate 19 to the wheel 13. An identical installation is then performed on the adjacent wheel, using another cover plate and the flange 37 at the other end of chain assembly 17. In this configuration, any attempt to move the trailer will rotate both wheels 13 and their respective cover plates 19 about their axles, causing the chain 35 to go taut which prevents any further rotation of the wheel, so stopping the motion of the trailer.

Figure 7:
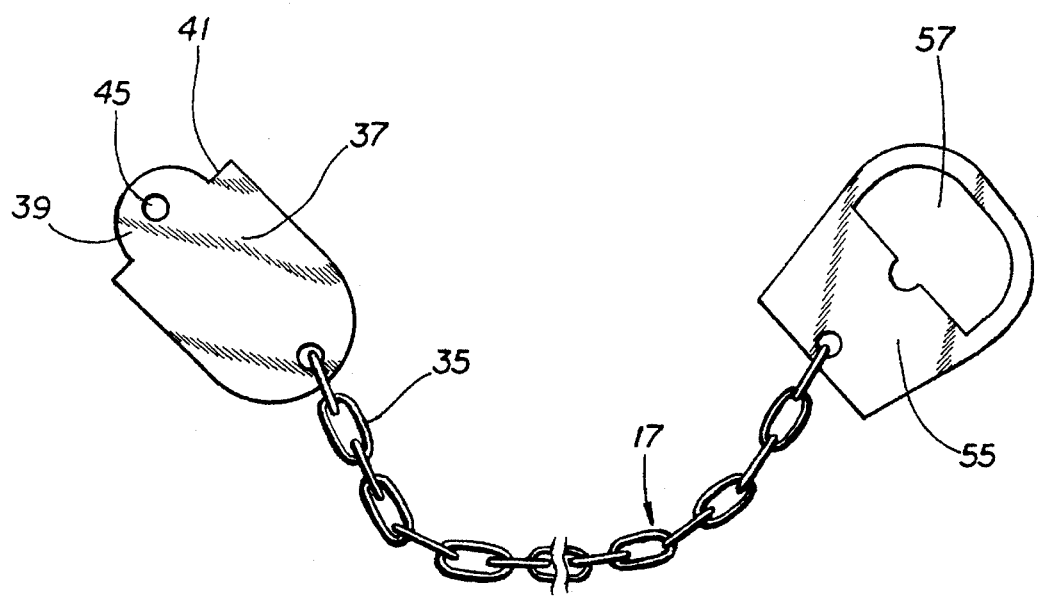
FIG. 7 is a top plan view of a second embodiment of the chain assembly for use on single axle trailers.
Figure 8:
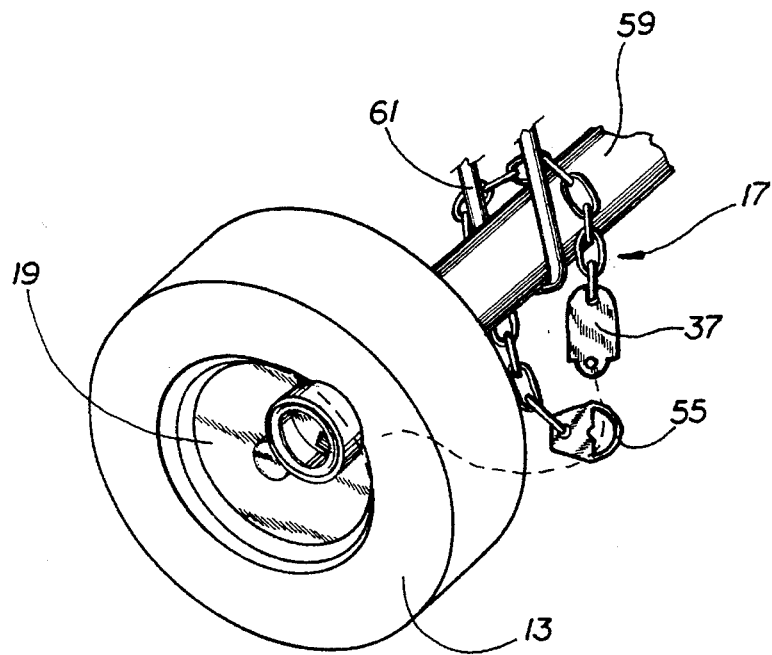
FIG. 8 is a perspective view of the second embodiment of a trailer wheel lock according to the invention, as it appears when being installed on a single axle trailer.

FIGS. 7 and 8 show an embodiment of the trailer wheel lock 11 for use on single axle trailers. As shown in detail in FIG. 7, the flange 55 on one end of the chain assembly 17 is shaped with an eyehole 57 through which the tongue 39 of flange 37 passes. The cover plate 15 is installed in the same manner as for the multiple axle embodiment. The chain assembly 17 is threaded around the axle 59 and the axle support 61, and the tongue 39 of the first chain flange is passed through the eyehole 57 of the second chain flange 55. The tongue 39 is then passed through the wheel slot 47 and the aligned cover plate slot 27 until shoulder 41 touches the wheel spoke 49. The shackle 51 of a padlock 53 is then passed through the eyehole 45 on the flange 37, and the padlock 53 is latched, securing the cover plate to the wheel.

The trailer wheel lock of the invention has several advantages over the prior art. The trailer wheel lock can be constructed simply and inexpensively. It is extremely rugged and durable. It has no complicated moving parts, and can be easily installed and removed. Finally, it not only prevents theft of the wheel, it prevents theft of the entire trailer on which the wheel lock is mounted.

The invention has been shown in two embodiments. It should be apparent to those skilled in the art that the invention is not so limited, but is susceptible to various changes and modifications without departing from the spirit of the invention.

I claim:

1. A trailer wheel lock for preventing theft of a trailer having a wheel on one end of an axle, wherein the trailer wheel lock comprises:

a cover plate covering an outer surface of the wheel on the axle;

a chain assembly having a chain with two ends, a first flange on one end of the chain, and a second flange on the other end of the chain, wherein the chain assembly extends through the wheel covered by the cover plate;

first locking means for securing the first flange to the cover plate, wherein the first flange extends through a cover plate slot in the cover plate, and wherein the first flange has a shoulder for preventing the first flange from passing completely through the cover plate slot; and second locking means for causing the chain to go taut in response to rotation of the wheel.

2. A trailer wheel lock as recited in claim 1 further comprising a protective sleeve attached to an outer surface of the cover plate and surrounding the cover plate slot and the first locking means.

3. A trailer wheel lock as recited in claim 2, further comprising a protector ring, wherein the protector sleeve has an outer end and the protector ring is attached to the protector sleeve inside the outer end of the protector sleeve.

4. A trailer wheel lock as recited in claim 1, wherein the first locking means is a first padlock secured to an eyehole through the first flange.

5. A trailer wheel lock for preventing theft of a trailer having a wheel on each end of at least two axles, wherein the trailer wheel lock comprises:

a first cover plate covering an outer surface of one of the wheels on one of the axles;

a second cover plate covering an outer surface of one of the wheels on another one of the axles;

a chain assembly having a chain, a first flange on one end of the chain, and a second flange on the other end of the chain, wherein the chain extends through the wheels covered by the first and second cover plates; and locking means for securing the first flange to the first cover plate and for securing the second flange to the second cover plate, wherein the first flange extends through a first cover plate slot in the first cover plate and the second flange extends through a second cover plate slot in the second cover plate, and wherein the first flange has a shoulder for preventing the first flange from passing completely through the first cover plate slot and the second flange has a shoulder for preventing the second flange from passing completely through the second cover plate slot.

6. A trailer wheel lock as recited in claim 5, further comprising a first protective sleeve attached to the outer surface of the first cover plate and surrounding the first cover plate slot and the locking means and a second protective sleeve attached to the outer surface of the second cover plate and surrounding the second cover plate slot and the locking means.

7. A trailer wheel lock as recited in claim 5, wherein the locking means is a first padlock secured to an eyehole through the first flange and a second padlock secured to an eyehole through the second flange.

8. A trailer wheel lock for preventing theft of a trailer having a wheel on one end of an axle, wherein the trailer wheel lock comprises:

a cover plate covering an outer surface of the wheel on the axle;

a chain assembly having a chain, a first flange on one end of the chain, and a second flange on the other end of the chain, wherein the chain extends through the wheel covered by the cover plate and around a non-rotating portion of the trailer;

first locking means for securing the flange to the cover plate, wherein the first flange extends through a cover plate slot in the cover plate, and wherein the first flange has a shoulder for preventing the first flange from passing completely through the first cover plate slot; and second locking means for securing the second flange to the first flange.

9. A trailer wheel lock as recited in claim 8, further comprising a protective sleeve attached to the outer surface of the cover plate and surrounding the cover plate slot and the first locking means.

10. A trailer wheel lock as recited in claim 8, wherein the first locking means is a padlock secured to an eyehole through the first flange.

11. A trailer wheel lock as recited in claim 8, wherein the first flange passes through an eyehole in the second flange.

\* \* \* \* \*